United States Patent
Achez (10) Patent No.: US 9,933,098 B2
(45) Date of Patent: Apr. 3, 2018

(54) APPARATUS TO COUPLE WITH AND DECOUPLE FROM A MALE COUPLER

(71) Applicant: Bert J. Achez, Topanga, CA (US)

(72) Inventor: Bert J. Achez, Topanga, CA (US)

(*) Notice: Subject to any disclaimer, the term of this patent is extended or adjusted under 35 U.S.C. 154(b) by 68 days.

(21) Appl. No.: 14/636,003

(22) Filed: Mar. 2, 2015

(65) Prior Publication Data
US 2015/0167881 A1    Jun. 18, 2015

Related U.S. Application Data

(62) Division of application No. 13/270,302, filed on Oct. 11, 2011, now Pat. No. 9,010,354.

(60) Provisional application No. 61/455,230, filed on Oct. 15, 2010.

(51) Int. Cl.
| | |
|---|---|
| *F16L 37/23* | (2006.01) |
| *F16L 37/40* | (2006.01) |
| *B08B 3/04* | (2006.01) |
| *F01P 3/20* | (2006.01) |
| *F01P 11/04* | (2006.01) |

(52) U.S. Cl.
CPC ............... *F16L 37/23* (2013.01); *B08B 3/04* (2013.01); *F01P 3/205* (2013.01); *F01P 11/04* (2013.01); *F16L 37/40* (2013.01); *Y10T 137/4245* (2015.04); *Y10T 137/9029* (2015.04)

(58) Field of Classification Search
CPC ......... F16L 37/23; F16L 37/40; F16L 37/138; F16L 37/086; F16L 37/22; B08B 3/04; F01P 3/205; F01P 11/04

USPC ..................... 285/316, 5, 317, 315
See application file for complete search history.

(56) References Cited

U.S. PATENT DOCUMENTS

| | | | |
|---|---|---|---|
| 1,427,105 A | 8/1922 | Handlan, Jr. | |
| 1,550,850 A | 8/1925 | Towle | |
| 2,521,701 A * | 9/1950 | Earle et al. ............. | F16L 37/23 285/277 |
| 3,464,436 A | 9/1969 | Bruning | |
| 3,550,612 A | 12/1970 | Maxon | |
| 4,672,998 A * | 6/1987 | Kozak, III ............ | F16L 27/093 137/614 |
| 5,350,329 A | 9/1994 | Haman | |
| 6,004,175 A | 12/1999 | McCoy | |
| 6,006,784 A | 12/1999 | Tsutsui et al. | |
| 6,027,097 A * | 2/2000 | Humphreys ............ | F16L 37/23 251/149.1 |
| 6,447,017 B1 * | 9/2002 | Gilbreath et al. .. | F16L 33/2075 285/256 |

(Continued)

*Primary Examiner* — Kevin Lee (57) ABSTRACT

Described herein is a method and apparatus for providing an easy-flow flushing system to flushing out an engine and an out-drive. The easy-flow flushing system may include a cap with a tubular member, a capping member, and a sleeve. The tubular member may include a first outer surface, an inner surface, a coil circumscribing the tubular member to urge a sleeve to a closed configuration, an opening along the first outer surface, and a ball bearing seated in the opening. The capping member may be coupled to the tubular member and the capping member can include a capping member end and a sealing ring disposed along a second outer surface. The sleeve may be coupled to the tubular member. The sleeve may include an inner surface, where the sleeve is formed and shaped to slide along a portion of the first outer surface of the tubular member.

20 Claims, 5 Drawing Sheets

(56) References Cited

U.S. PATENT DOCUMENTS

| | | | |
|---|---|---|---|
| 6,682,106 B2 * | 1/2004 | Parker | F16L 37/23 |
| | | | 285/277 |
| 6,916,008 B2 * | 7/2005 | Noble et al. | F16L 37/42 |
| | | | 251/149.6 |
| 7,150,665 B1 | 12/2006 | Soreide et al. | |
| 7,625,256 B2 | 12/2009 | Bertino et al. | |
| 8,690,198 B2 * | 4/2014 | Saber et al. | H01R 13/6276 |
| | | | 285/276 |
| 9,010,354 B2 | 4/2015 | Achez | |
| 9,010,355 B1 | 4/2015 | Achez | |
| 2009/0029609 A1 | 1/2009 | Breece et al. | |

* cited by examiner

APPARATUS TO COUPLE WITH AND DECOUPLE FROM A MALE COUPLER

CROSS-REFERENCE TO RELATED APPLICATION

This application is a divisional of U.S. patent application Ser. No. 13/270,302 filed Oct. 11, 2011, which claims the benefit of U.S. Provisional Patent Application No. 61/455,230 filed Oct. 15, 2010. These applications are incorporated by reference herein in their entirety.

BACKGROUND

The present invention relates to liquid distribution. More particularly, the invention relates to providing an inlet for a liquid from an exterior location for conveyance to an interior location.

Cooling is a critical phase of engine operation. Cooling water passes through the cylinder heads and block, drawing off heat generated by fuel combustion and engine friction. Proper operation of the cooling system is critical to maintaining satisfactory engine operation and performance. Engines at sea, however, use salt water to do this, which is very corrosive to the out-drive and engine parts. Therefore it is imperative to flush a cooling system after each use. Hence, the need for a fast efficient way to flush out the boat or ship without the need to lift the engine cover, deal with shut-off valves, and/or have need for current flush-out equipment placed on the out-drive—which must be watched mindfully during operation.

SUMMARY OF THE INVENTION

In general, the present invention in a first aspect provides an easy-flow valve comprising (a) a tubular body having first and second ends; (b) a quick connect-disconnect first coupling at the first end of the tubular body; (c) a plurality of barbs or threads on surface of the second end of the tubular body, forming a quick connect-disconnect second coupling at the second end of the tubular body; (d) a flange near the first end of the tubular body, for mounting the valve against a flat surface, the flange being connected to the first coupling and to the tubular body near the first end of the tubular body, the flange circumscribing the first coupling and the tubular body; and (e) a lock nut near and circumscribing the second end of the tubular body, for locking and unlocking the easy-flow valve.

In a second aspect the invention provides an easy-flow flushing system for flushing out an engine and out-drive. The system comprises (a) an easy-flow valve comprising a tubular body having first and second ends; a quick connect-disconnect first coupling at the first end of the tubular body, for incoming water; a plurality of barbs or threads on surface of the second end of the tubular body, forming a quick connect-disconnect second coupling at the second end of the tubular body; a flange near the first end of the tubular body, for mounting the valve against a flat surface, the flange being connected to the male coupler of the first coupling and to the tubular body near the first end of the tubular body, the flange circumscribing male coupler of the first coupling and the tubular body; and a lock nut near and circumscribing the second end of the tubular body, for locking and unlocking the easy-flow valve; (b) a first conduit for conveying a portion of water out of the system, flushing out the out-drive, from the easy-flow valve through a y-shaped connector to a second conduit; (c) a first segment of the second conduit, for conveying a portion of the water out of the system; (d) a second segment of the second conduit, for conveying a portion of the water to and through an impeller; and (e) a third conduit, for conveying water to a circulation pump of the engine, for circulation through the engine.

In a third aspect, the invention provides a sealing cap for an easy-flow valve. The sealing cap comprises (a) an open first end; (b) a closed second end; (c) an outer surface and an inner surface; (d) a washer disposed at the second end of the sealing cap within the inner surface of the sealing cap; (e) an O-ring disposed within the inner surface n ear the second end of the sealing cap; (f) a first groove in which the O-ring is seated; (g) a plurality of ball bearings seated in concave openings near the first end of the sealing cap; (h) an outer sleeve surrounding the ball bearings, which float freely in the sleeve; (i) a cylindrical member having an outer surface on which the sleeve slides; (j) a spring surrounding the cylindrical member, for urging the sleeve to a closed or locked configuration; (k) a snap ring disposed in front of and retaining the sleeve; and (l) a second groove, in which the snap ring is seated.

DESCRIPTION OF EMBODIMENTS

Figure 1:
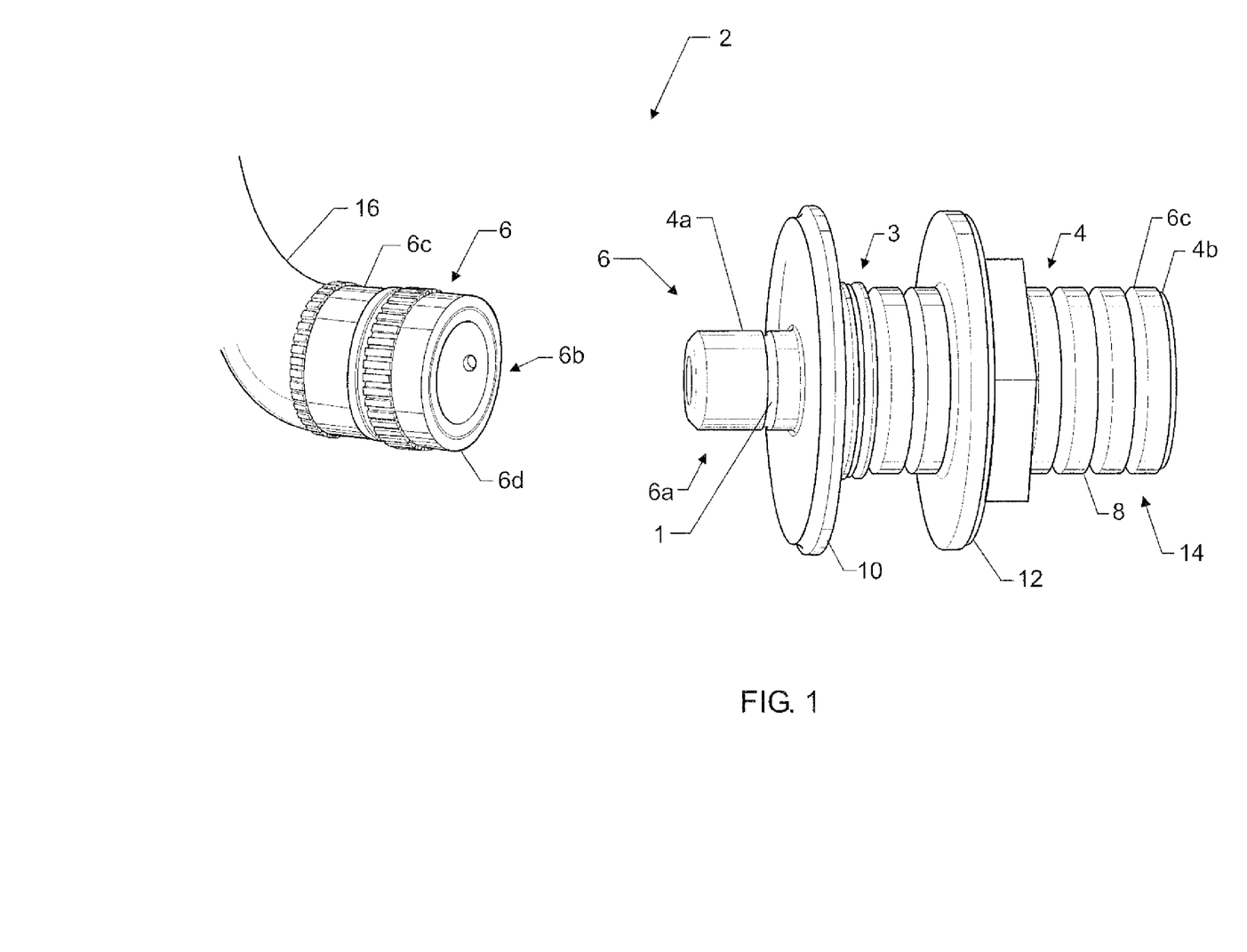
FIG. 1 is a schematic representation of an easy-flow valve, made in accordance with the principles of the present invention, with a hose attached thereto.

More specifically, reference is made to FIG. 1, in which is shown uneasy-flow valve, made in accordance with the principles of the present invention, and generally designated by the numeral 2.

The easy-flow valve 2 comprises a tubular body 4 having first and second ends 4 $a$ and 4 $b$; a quick connect-disconnect first coupling 6 at the first end 4 $a$ of the tubular body 4; a plurality of barbs or threads 8 on the outer surface 4 $c$ of the second end 4 $b$ of the tubular body 4; a flange 10 near the first end 4 $a$ of the tubular body 4; and a lock nut 12 circumscribing the tubular body 4.

The barbs or threads 8 on the outer surface 4 $c$ of the tubular body 4 form a quick connect-disconnect second coupling 14 at the second end 4 $b$ of the tubular body 4. The flange 10 is for mounting the valve 2 against a flat surface (not shown). Although the flange 10 enables mounting on a flat surface, weld-on or thread-on mounts would not require a flange. The flange 10 is connected to a male coupler 6 $a$ of the first coupling 6 and to the tubular body 4 near the first end 4 $a$ of the tubular body 4, and circumscribes the back end 6 $c$ of a male coupler 6 $a$ of the first coupling 6 and the tubular body 4. The lock nut 12 utilizes a plurality of threads 3 to lock and unlock the easy-flow valve 2.

The first coupling 6 has a male coupler 6 $a$ and a female coupler 6 $b$, and is thereby self-sealing. The male coupler 6 $a$ includes a circumscribing groove 1 for locking into place the female coupler 6 $b$. The self-sealing capability of the first coupling 6 prevents air from entering a work piece such as a boat engine (not shown) when the valve 2 is being used to service the work piece. During such operation, the first coupling 6 may beneficially be connected to a garden hose 16 for conveying water (not shown) to the easy-flow valve 2. The hose 16 is attached to the threaded end 6 *c* of the female coupler 6 *b*, and the unthreaded end 6 *d* of the female coupler 6 *b* is connected to the male coupler 6 *a* of the easy-flow valve 2.

Figure 2:
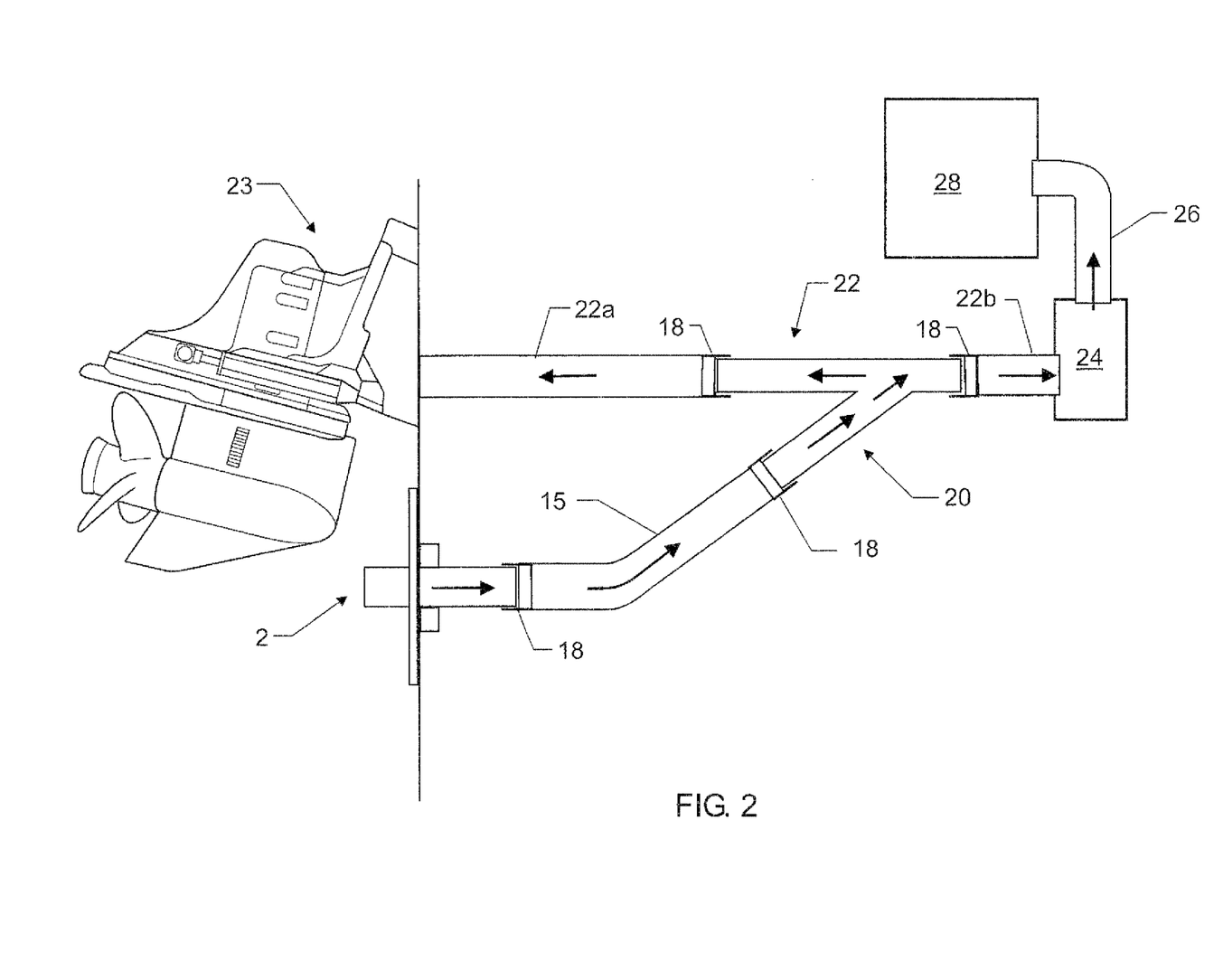
FIG. 2 is a schematic representation of a system for flushing out an engine on a boat, in accordance with the principles of the present invention.

Reference is now made to FIG. 2, in which is shown a system, made in accordance with the principles of the present invention, for flushing out an engine for a boat or ship (not shown).

The system comprises the easy-flow valve 2 shown in detail in FIG. 1, a heavy-duty service hose 15, a plurality of fasteners 18 attached to the hose 15, a y-shaped connector 20, a first connecting member 22, an impeller 24, and a second connecting member 26. The hose 15 conveys incoming water from the easy-flow valve 2 through the y-shaped connector 20 to the first connecting member 22. With the engine off, water flows from and through the first connecting member 22, and out through the out-drive 23 of the system. With the engine running, a portion of the water flows out of the system through a first segment 22 *a* of the first connecting member 22, and a portion flows through a second segment 22 *b* of the first connecting member 22 to and through the impeller 24 and through a second connecting member 26 to a circulation pump 28. Water from the circulation pump 28 is then circulated through the engine on board the boat or ship (not shown). It is important to circulate water through the system with the engine off and on, in order to flush the entire system.

Figure 3:
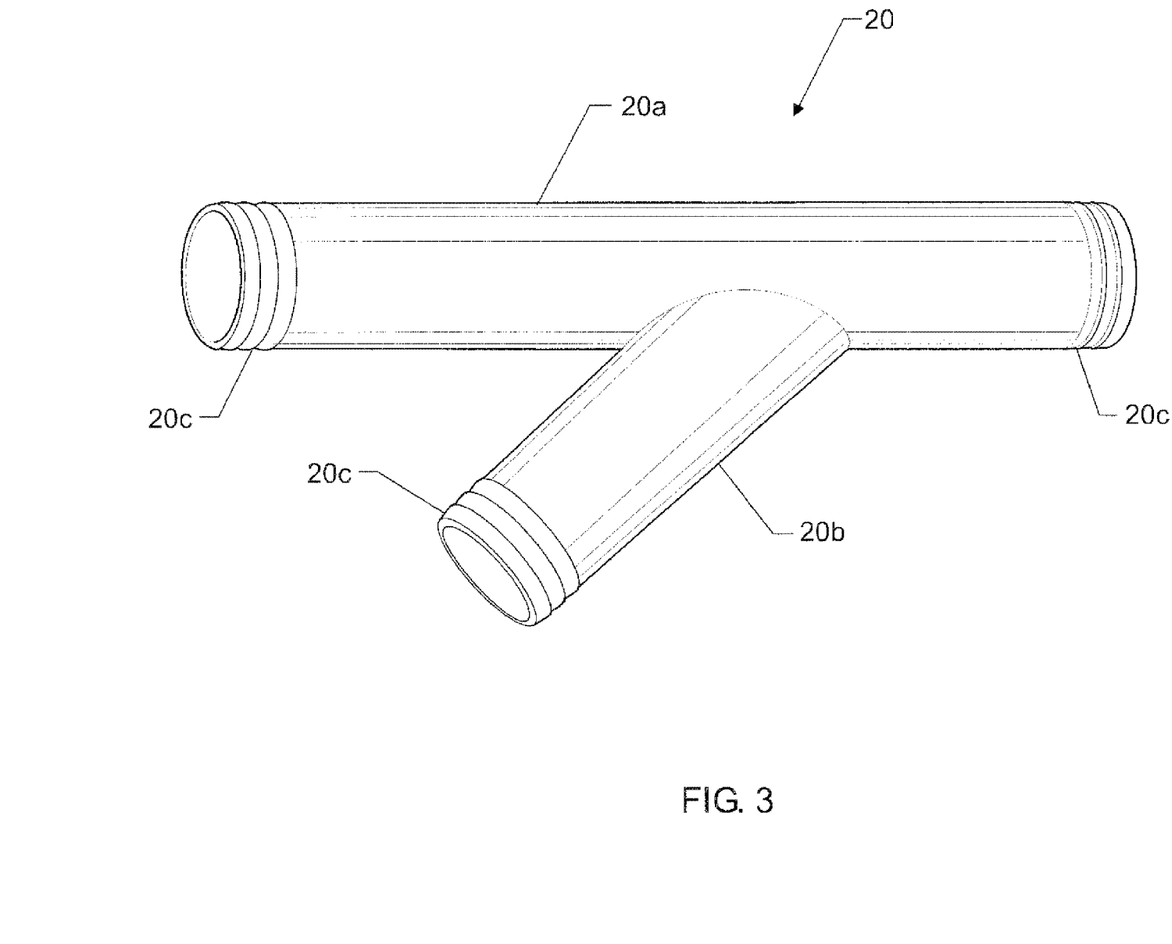
FIG. 3 is a schematic representation of a y-shaped connector equipped with barbs.

The detailed construction of the y-shaped connector 20 is shown in FIG. 3. The y-shaped connector 20 comprises a first segment 20 *a* and a second segment 20 *b*. The first and second segments 20 *a*, 20 *b* define a geometric "y." Each segment 20 *a* and 20 *b* is provided with a plurality of barbs 20 *c* to facilitate connection to the fasteners 18 on the second connecting member 22 shown in FIG. 2.

Figure 4:
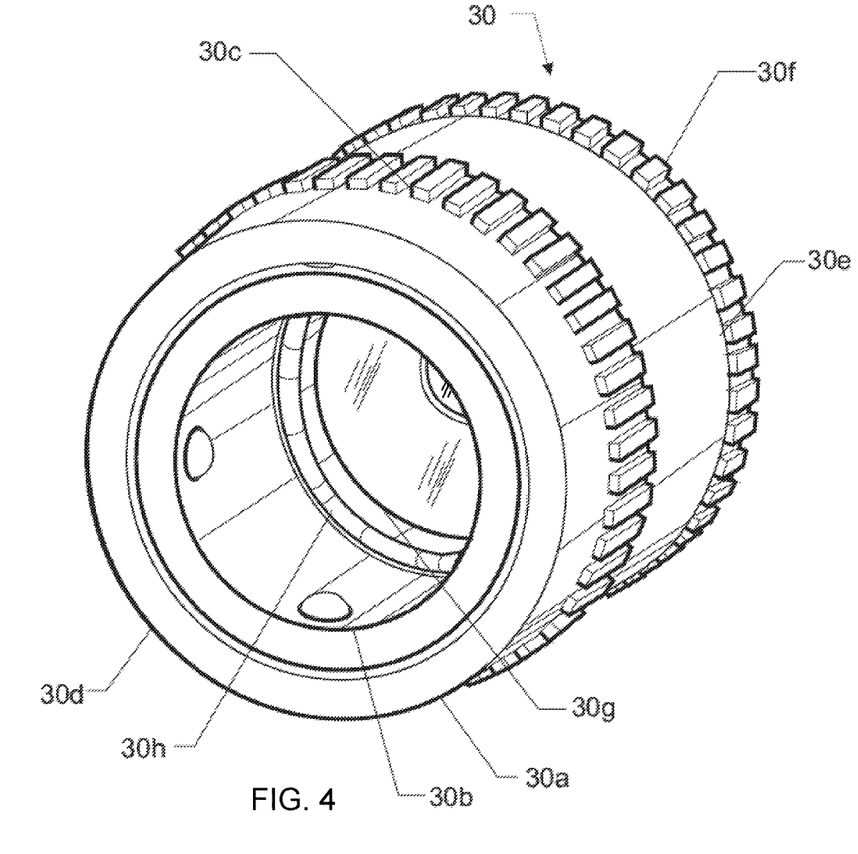
FIG. 4 is a schematic representation of a sealing cap for the easy-flow valve shown in FIG. 1
Figure 5:
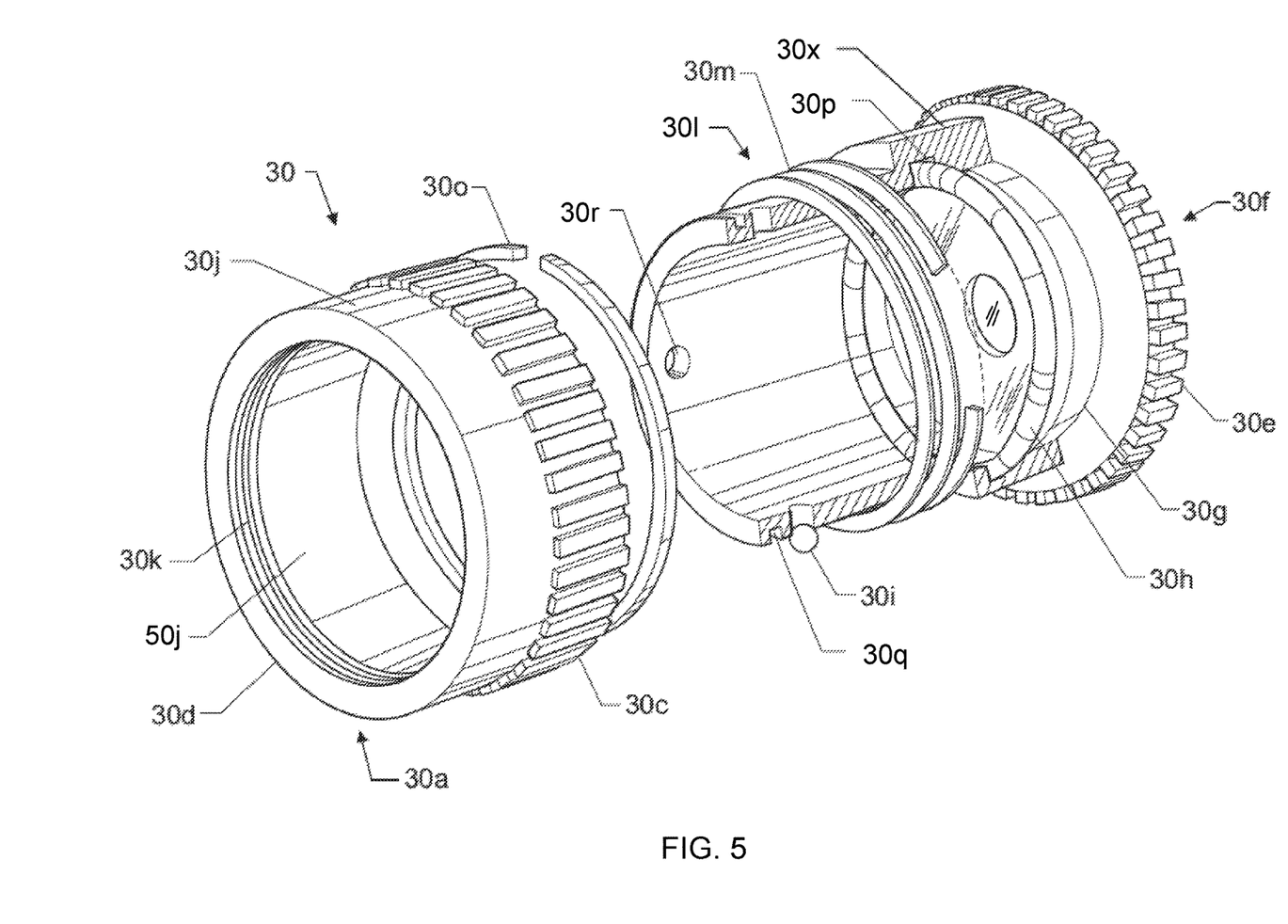
FIG. 5 is an exploded view of the sealing cap shown in FIG. 4.

In FIGS. 4 and 5 is shown a sealing cap, generally designated by the numeral 30, for the easy-flow valve 2 shown in FIG. 1.

The sealing cap 30 pertains to quick connect/disconnect couplings for a standard garden hose. More specifically, the sealing cap 30 caps off the male coupler 6 *a* of the easy-flow valve 2. The cap 30 should remain on the male coupler 6 *a* at all times except during the flushing process. While the system is being flushed, the female coupler 6 *b* is connected to the garden hose 16 (FIG. 1) and mated with the male coupler 6 *a*. During this time the male coupler 6 *a* does not need to be capped, because the male coupler 6 *a* is being used as a sealed passageway for water. After being flushed, the engine is turned off, and the cap 30 is replaced on the male coupler 6 *a* using the same procedure as in connecting the female coupler 6 *b*. Usually, the female coupler 6 *b* is connected to a garden hose for spraying down about. However, in the case of the present invention, the male coupler 6 *a* of the easy flow valve 2 is used as an inlet to a closed environment, and it is critical that said environment be completely sealed. The cap 30 is an external means of sealing the easy-flow valve 2 shown in FIG. 1 and the system shown in FIG. 2 for flushing out an engine on a boat or ship. If the male coupler 6 *a* is provided with an internal spring disk valve, such a valve restrains water and air from entering by spring pressure, forcing an element back to its seat, and thereby forming an air/water-tight seal. This seal will not open from the suction created by the circulation pump 28, but can be overcome by standard water pressure used to flush out the engine. The cap 30, however, not only seals securely the male coupler 6 *a* of the easy-flow valve 2, but also provides protection from wear and abrasion. Moreover, the cap 30 provides a uniquely efficient and quick way to seal and protect the male coupler 6 *a* of the easy-flow valve 2 without the possibility of the connection becoming loosened, Preferably, a connecting chain (not shown) is attached from the sealing cap 30 to the flange 10, in order to prevent accidental loss of the cap 30.

More specifically, the sealing cap 30 comprises an outer surface 30 *a* and an inner surface 30 *b*. The outer surface 30 *a* is provided with a plurality of protuberances 30 *c* at a first end 30 *d*, and a plurality of smaller protuberances 30 *e* at a second end 30 *f*. The protuberances 30 *c* and 30 *e* provide a grooved, rough surface for non-slip gripping of the sealing cap 30. The first end 30 *d* of the cap 30 is open, and the second end 30 *f* is closed. A washer 30 *g* is disposed at the second end 30 *f* within the inner surface 30 *b* of the cap 30. An O-ring 30 *h* is disposed within the inner surface 30 *b* near the second end 30 *f* of the sealing cap 30, and is seated in a groove 30 *p*. The washer 30 *g* forms a sealed passageway when the male coupler 6 *a* seats against the washer 30 *g*. The male coupler 6 *a* fits tightly in and through the O-ring 30 *h* to form a second seal.

Near the first end 30 *d* of the cap 30 are three evenly-spaced ball bearings 30 *i*. The ball bearings 30 *i* are seated in concave openings 30 *r* that are smaller than the ball bearings 30 *i*, so that the ball bearings 30 *i* do not and cannot fall through the openings 30 *r*. The ball bearings 30 *i* float freely against an outer surrounding sleeve 30 *j*. The inside surface 30 *k* of the sleeve 30 *j* is tapered at its front end 50 *j*, and slides on the outer surface 50 *m* of a cylindrical member 30 *l*. A spring 30 *m* surrounding the cylindrical member 30 *l* rests against a thicker portion 30 *x* of the outside surface 50 *m* on of the cylindrical member 30 *l*, and urges the tapered sleeve 30 *j* to a closed or locked configuration. In this position the inside surface 30 *k* of the tapered sleeve 30 *j* is thickest, causing a downward pressure against the ball bearings 30 *i*, pushing them into a groove surrounding the male coupler 6 *a*. There is now a seal at the washer 30 *g* and the O-ring 30 *h*, and the ball bearings 30 *i* are pressed hard, seating them firmly in the openings 30 *r*. The spring 30 *m* keeps the sleeve 30 *j* in a locked configuration. If the sleeve 30 *j* is pulled backward, the ball bearings 30 *i* are disengaged, releasing the male coupler 6 *a*. A snap ring 30 *o* fits in front of and retains the sleeve 30 *j*, and is seated in a groove 30 *q*.

The cap 30 ensures operation of the water-suctioning process created by the circulation pump 28 (FIG. 2) without sucking in air, which would cause the engine to overheat. The cap 30 provides a fail-safe mechanism that prevents air, water, and other potential contaminants from being sucked into a boat's cooling system via the male coupler 6 *a*. For a marine application involving boats, brass or stainless-steel coupling should be used. When the cap 30 and the male coupler 6 *a* are mated, the first end of the male coupler 6 *a* presses against the washer 30 *g* at the second end 30 *f* of the cap 30, and seats into the O-ring 30 *h*. This operation completely seals off the male coupler 6 *a* from air and water.

The present invention enables change from flushing out the engine, attaching a nozzle (not shown), and spraying the boat down without turning off the water supply.

While certain specific embodiments and details have been described to illustrate the principles of the present invention, it will be apparent to those skilled in the art that many modifications are possible within the scope of the claimed invention.

What is claimed is:

1. An apparatus to couple with and decouple from a male coupler, the apparatus comprising:
   a cylindrical member, comprising:
      a first cylindrical outer surface comprising a first portion and a second portion, wherein the second portion has a greater diameter than the first portion;
      a first cylindrical inner surface, wherein the first inner surface comprises a first groove disposed opposite the second portion;
      a first cylindrical member end, wherein the first cylindrical member end is a first open end; and
      a second cylindrical member end, wherein the second cylindrical member end prevents liquid flow through the apparatus;
   an O-ring disposed in the first groove, wherein the O-ring couples with an outer surface of the male coupler responsive to the apparatus coupling with the male coupler;
   a sleeve coupled to the cylindrical member, the sleeve comprising a first distal end, a second distal end opposite the first distal end, a sleeve outer surface disposed from the first distal end to the second distal end, and a sleeve inner surface disposed from the first distal end to the second distal end, wherein the sleeve is disposed around the first portion of the first cylindrical outer surface of the cylindrical member; and
   a spring circumscribing the first portion of the first cylindrical outer surface of the cylindrical member, wherein the spring engages with the second portion of the cylindrical member and the spring engages with the second distal end of the sleeve, wherein the spring urges the sleeve into a closed configuration, wherein the first distal end of the sleeve is proximate the first cylindrical member end in the closed configuration.

2. The apparatus of claim 1 further comprising a snap ring disposed in a second groove in the first portion of the cylindrical outer surface of the cylindrical member, wherein the second groove is adjacent the first cylindrical member end, wherein the first distal end of the sleeve engages with the snap ring in the closed configuration.

3. The apparatus of claim 1, wherein the cylindrical member further comprises a concave opening in the first portion of the first cylindrical outer surface proximate the first cylindrical member end, wherein the apparatus further comprises a ball bearing seated in the concave opening, wherein the ball bearing engages with a third groove in the male coupler responsive to the sleeve being in the closed configuration and the apparatus coupling with the male coupler.

4. The apparatus of claim 3, wherein the spring is disposed between the concave opening and the second portion of the first cylindrical outer surface.

5. The apparatus of claim 1, wherein the sleeve inner surface is tapered, wherein a first diameter of the sleeve inner surface proximate the first distal end is greater than a second diameter of the sleeve inner surface proximate the second distal end, wherein the sleeve engages with one or more ball bearings that engage with a third groove in the male coupler responsive to the sleeve being in the closed configuration, wherein the sleeve disengages with the one or more ball bearings responsive to the sleeve not being in the closed configuration.

6. The apparatus of claim 1, wherein the apparatus further comprises a washer disposed within the cylindrical member between the second cylindrical member end and the O-ring, wherein the washer couples with an end surface of the male coupler responsive to the apparatus coupling with the male coupler.

7. The apparatus of claim 1, wherein the second cylindrical member end prevents liquid flow through the apparatus in response to the apparatus being coupled with the male coupler, wherein the second cylindrical member end is a closed end.

8. The apparatus of claim 1, wherein the second cylindrical member end prevents liquid flow through the apparatus in response to the apparatus being decoupled from the male coupler, wherein the second cylindrical member end allows liquid flow through the apparatus in response to the apparatus being coupled with the male coupler.

9. The apparatus of claim 1, wherein the apparatus is a quick connect or quick disconnect coupling.

10. The apparatus of claim 8, wherein the apparatus is a female coupler comprising a first coupler end and a second coupler end, wherein the first coupler end couples with the male coupler of a valve and the second coupler end couples with a hose.

11. The apparatus of claim 10, wherein the apparatus seals the valve from external fluid or particles responsive to the apparatus coupling with the male coupler.

12. A apparatus to couple with and decouple from a male coupler, the apparatus comprising:
   a cylindrical member, comprising:
      a first cylindrical outer surface comprising a first portion and a second portion, wherein the second portion has a greater diameter than the first portion;
      a first cylindrical inner surface, wherein the first inner surface comprises a first groove disposed opposite the second portion;
      a first cylindrical member end, wherein the first cylindrical member end is a first open end;
      and a second cylindrical member end, wherein the second cylindrical member end is a closed end;
   an O-ring disposed in the first groove, wherein the O-ring and the second cylindrical member end prevent liquid flow through the apparatus in response to the O-ring coupling with an outer surface of the male coupler responsive to the apparatus coupling with the male coupler;
   a sleeve coupled to the cylindrical member, the sleeve comprising a first distal end, a second distal end opposite the first distal end, a sleeve outer surface disposed from the first distal end to the second distal end, and a sleeve inner surface disposed from the first distal end to the second distal end, wherein the sleeve is disposed around the first portion of the first cylindrical outer surface of the cylindrical member; and
   a spring circumscribing the first portion of the first cylindrical outer surface of the cylindrical member, wherein the spring engages with the second portion of the cylindrical member and the spring engages with the second distal end of the sleeve, wherein the spring urges the sleeve into a closed configuration, wherein the first distal end of the sleeve is proximate the first cylindrical member end in the closed configuration.

13. The apparatus of claim 12, wherein the apparatus is a sealing cap that seals the male coupler from the liquid flow and from air flow.

14. The apparatus of claim 12 further comprising:
   a snap ring disposed in a second groove in the first portion of the first cylindrical outer surface proximate the first cylindrical member end, wherein the first distal end of the sleeve engages with the snap ring in the closed configuration; and one or more ball bearings, wherein each of the one or more ball bearings is disposed in a respective concave cavity in the first portion of the first cylindrical outer surface proximate the second groove, wherein the sleeve engages with the one or more ball bearings in the closed configuration and the one or more ball bearings engage with a third groove in the male coupler in the closed configuration.

15. The apparatus of claim 12, wherein the apparatus further comprises a washer disposed within the cylindrical member between the second cylindrical member end and the O-ring, wherein the washer further prevents liquid flow through the apparatus in response to an end surface of the male coupler seating against the washer responsive to the apparatus coupling with the male coupler.

16. An apparatus to couple with and decouple from a male coupler, the apparatus comprising:

a cylindrical member, comprising:
 a first cylindrical outer surface comprising a first portion and a second portion, wherein the second portion has a greater diameter than the first portion;
 a first cylindrical inner surface, wherein the first inner surface comprises a first groove disposed opposite the second portion;
 a first cylindrical member end, wherein the first cylindrical member end is a first open end; and
 a second cylindrical member end, wherein the second cylindrical member end couples to a hose, wherein the second cylindrical member end prevents liquid flow through the apparatus from the hose responsive to being decoupled from the male coupler, wherein the second cylindrical member end allows liquid flow through the apparatus from the hose responsive to being coupled with the male coupler;

a sealing ring disposed in the first groove, wherein the sealing ring couples with an outer surface of the male coupler responsive to the apparatus coupling with the male coupler;

a sleeve coupled to the cylindrical member, the sleeve comprising a first distal end, a second distal end opposite the first distal end, a sleeve outer surface disposed from the first distal end to the second distal end, and a sleeve inner surface disposed from the first distal end to the second distal end, wherein the sleeve is disposed around the first portion of the first cylindrical outer surface of the cylindrical member; and a coil circumscribing the first portion of the first cylindrical outer surface of the cylindrical member, wherein the coil engages with the second portion of the cylindrical member and the coil engages with the second distal end of the sleeve, wherein the coil urges the sleeve into a closed configuration, wherein the first distal end of the sleeve is proximate the first cylindrical member end in the closed configuration.

17. The apparatus of claim 16, wherein the apparatus allows coupling to the male coupler, decoupling from the male coupler, and coupling with a second male coupler without turning off a water supply through the hose.

18. The apparatus of claim 16 further comprising a snap ring disposed in a second groove in the first portion of the cylindrical outer surface of the cylindrical member, wherein the second groove is proximate the first cylindrical member end, wherein the first distal end of the sleeve engages with the snap ring in the closed configuration.

19. The apparatus of claim 16, wherein the cylindrical member further comprises a plurality of openings in the first portion of the first cylindrical outer surface, wherein the apparatus further comprises a plurality of ball bearings, wherein each of the plurality of ball bearings is seated in a respective opening of the plurality of openings.

20. The apparatus of claim 16, wherein the apparatus is a quick connect or quick disconnect coupling.

* * * * *